(12) United States Patent
Rieger

(10) Patent No.: US 8,706,578 B2
(45) Date of Patent: Apr. 22, 2014

(54) USING ACCOUNT SYMBOLS INSTEAD OF GENERAL LEDGER ACCOUNTS IN THE TRANSACTION MESSAGES OF THE BUSINESS APPLICATIONS OF AN ENTERPRISE

(75) Inventor: Lothar Rieger, Bammental (DE)

(73) Assignee: SAP AG, Walldorf (DE)

( * ) Notice: Subject to any disclaimer, the term of this patent is extended or adjusted under 35 U.S.C. 154(b) by 539 days.

(21) Appl. No.: 12/577,740

(22) Filed: Oct. 13, 2009

(65) Prior Publication Data

US 2011/0087567 A1  Apr. 14, 2011

(51) Int. Cl.
*G07B 17/00* (2006.01)
*G07F 19/00* (2006.01)

(52) U.S. Cl.
USPC ............................................................. 705/30

(58) Field of Classification Search
None
See application file for complete search history.

(56) References Cited

U.S. PATENT DOCUMENTS 6,275,813 B1 *  8/2001  Berka ............................. 705/30
2005/0021464 A1 *  1/2005  Lindauer et al. ................ 705/40

* cited by examiner

*Primary Examiner* — Paul Danneman

(57) ABSTRACT

Systems and methods for using account symbols instead of general ledger accounts in the accounting documents generated by the business applications running in an enterprise environment are described. A correspondence between account symbols and general ledger accounts is defined and stored in a memory of a computer system. A business application generates accounting entries using account symbols instead of general ledger accounts. The generated account messages are received at an accounting application through an inbound interface. The account symbols in the accounting entries are replaced with the corresponding general ledger accounts. Financial documents are generated at the receiving accounting application based on the financial entries.

20 Claims, 7 Drawing Sheets

USING ACCOUNT SYMBOLS INSTEAD OF GENERAL LEDGER ACCOUNTS IN THE TRANSACTION MESSAGES OF THE BUSINESS APPLICATIONS OF AN ENTERPRISE

FIELD OF INVENTION

The field of the invention relates generally to data processing and digital processing systems. More specifically, the invention is related to inbound transferring of financial data within a complex computer system environment that includes a number of computer applications.

BACKGROUND OF THE INVENTION

Virtually every successful business enterprise implements various computer applications to automate different business processes. For example, an enterprise automates the processing of purchase orders with the help of so called logistics computer application. The same enterprise could use a supply chain management application to organize and optimize the production of goods and services. Many large enterprises have subsidiaries or branches in different locations, sometimes in different countries. Such enterprises usually have complex computer system environments that include separate or autonomous sets of computer applications at each location for automating the respective business processes. The sets of different computer applications running at the different locations (or subsidiary companies, or branches) could be integrated in an enterprise resource planning (ERP) system. Very often, some of the computer applications in such a set are legacy programs developed by different vendors.

In every business enterprise or legal entity, financial documents are attached to virtually all activities that involve resource management. For example, processing of sales orders in a logistic system of a company is accompanied by crediting revenue accounts and debiting account receivables in the company general ledger; transfer of goods from suppliers to consumers is accompanied by debiting material stock accounts and crediting special reconciliation accounts; employees payroll is accompanied with debiting expense accounts and crediting liability accounts; etc. Typically, the application that automates an action creates a corresponding business transaction and produces the accounting document that accompanies this action, e.g., a logistic system produces the necessary accounting documents for each purchase order. The different autonomous applications running in an enterprise produce accounting documents or accounting entries that are incorporated in a number of financial documents and are posted to the general ledger of the enterprise. In general, such enterprise employs a central financial system to receive and post financial documents produced by the sets of applications at the different locations.

FIG. 1 is a block diagram of an exemplary computer system 100 for enterprise business processes automation. In computer system 100, logistics application 110 and accounting application 115 are illustrated. This configuration could include other applications as well, for example, a supply chain management or human capital management application could be illustrated instead of logistics application 110. In addition, the illustrated application is one of a number of applications with similar accounting functions running in different subsidiaries or locations of the enterprise. In logistics application 110, logistics transaction data 120 is collected for every single operation performed. For example, receiving a purchase order is one such operation.

Chart of accounts 125 stores a full list of general ledger (GL) accounts. The GL accounts are used in the accounting entries that are generated for each of the transactions performed in logistics application 110. To generate an accounting entry, logistics application 110 needs additional financial configurations and customizations. These additional data reflect company and statutory requirements, and are stored in module other finance configuration 130. Logistics application 110 utilizes financial logic 135 to generate the necessary accounting entries based on the data from logistics transaction data 120, chart of accounts 125 and other finance configuration 130. The generated accounting entries for the transactions or actions executed in logistics application 110 are included in financial documents 140. Financial documents 140 contain the relevant general ledger accounts from chart of accounts 125 and are locally stored in local GL 145 by logistics application 110 for different purposes, e.g., auditing, reporting, settlement, etc.

Logistics application 110 and the other applications in the same or different locations with similar accounting capabilities, if any, replicate financial documents 140 to accounting application 115. Replicated documents 155 are centrally posted in central GL 160. Central GL 160 stores a full record of the performed transactions by the applications running in the enterprise. Logistics application 110, as well as any other business application with accounting capabilities running in computer system 100, utilizes inbound interface 170 to replicate financial documents 140 to accounting application 115.

The financial configuration master data, necessary for generating accounting entries by logistics application 110, and by the rest of the business applications running in computer system 100, is stored in accounting application 115. This master data includes chart of GL accounts 150, and configuration data (not illustrated in FIG. 1). Accounting application 115 utilizes interface 165 to replicate chart of GL accounts 150 to logistics application 110.

Generally, the master data is frequently changed due to various reasons, including organizational changes, changes in the business practices, statutory changes, etc. In a system environment, where a set of autonomous applications generate accounting entries and replicate them to a accounting application, financial configuration master data have to be replicated or distributed consistently among a number of different business applications. Often, the business applications are even developed by different vendors. Additionally, the changes to the master data usually require changes in the local configuration and customization in the different business applications. The accounting functionality integrated in the various business applications of an enterprise is not directly related with their main purpose and functions—to automate various business processes.

The financial governance of the different business applications, characterized with frequent need for ensuring consistent transfer of financial data, and the related re-configuration and re-customization of the accounting functionality, could be a tedious task for the administrative staff. Such financial governance consumes substantial resources, and generates a potential for errors in accounting entries with unpredictable consequences. Furthermore, different business applications have to implement similar accounting functionality and to use the same inbound and outbound interfaces to generate coherent accounting statements. This is difficult even when all applications running in an enterprise environment are developed by one and the same vendor. When different vendors are involved in the process, the resource consumption and the risk of errors and inconsistency could be much higher.

SUMMARY OF THE INVENTION

Systems and methods for using account symbols instead of general ledger accounts in the accounting documents generated by the business applications running in an enterprise environment are described. A correspondence between account symbols and general ledger accounts is defined and stored in a memory of a computer system. A business application generates accounting entries where account symbols are included instead of general ledger accounts. The generated account entries are received as messages at an accounting application through an inbound interface. The account symbols in the accounting entries are replaced with corresponding general ledger accounts at the receiving accounting application. Financial documents are generated at the receiving application based on the accounting entries. The financial documents are posted to the general ledger of the enterprise.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for 'Using Account Symbols instead of General Ledger Accounts in the Transaction Messages of the Business Applications of an Enterprise' are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In a typical enterprise computer system environment one or more enterprise resource planning (ERP) systems are employed. Every ERP system automates various business processes of an organizational entity of the enterprise by running a number of business applications, e.g., logistics application, supply change management, human capital management, etc. In addition to automating business processes, the business applications generate accounting entries corresponding to the transactions of these processes. The accounting entries are transferred from the business applications of the ERP systems to a central financial system that runs accounting application. The accounting application generates detailed financial documents complying with various statutory and enterprise accounting requirements, and post the documents in enterprise general ledger (GL).

Figure 1:
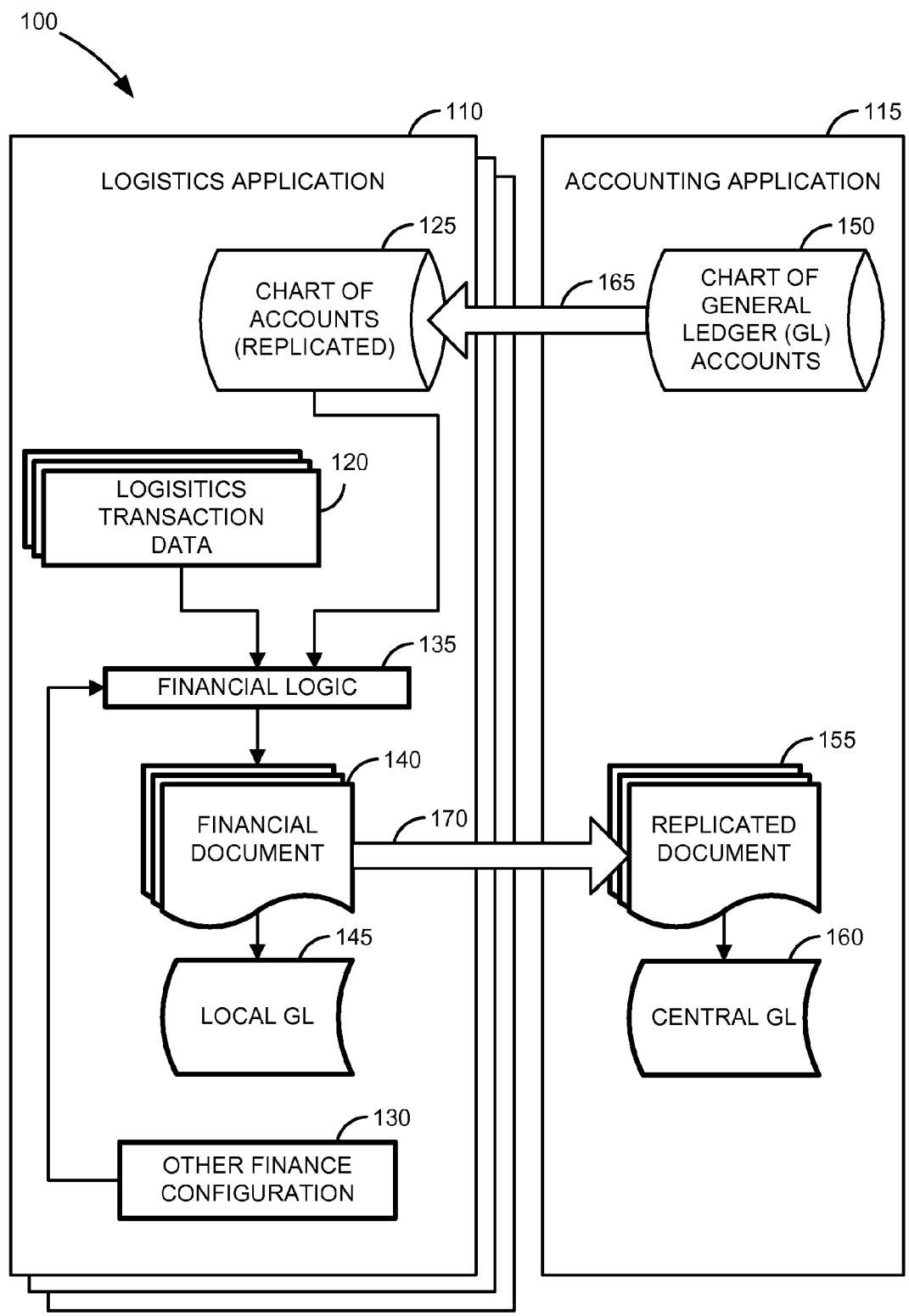
FIG. 1 is a block diagram of an exemplary computer system for business processes automation illustrating the elements for generating accounting records.
Figure 2:
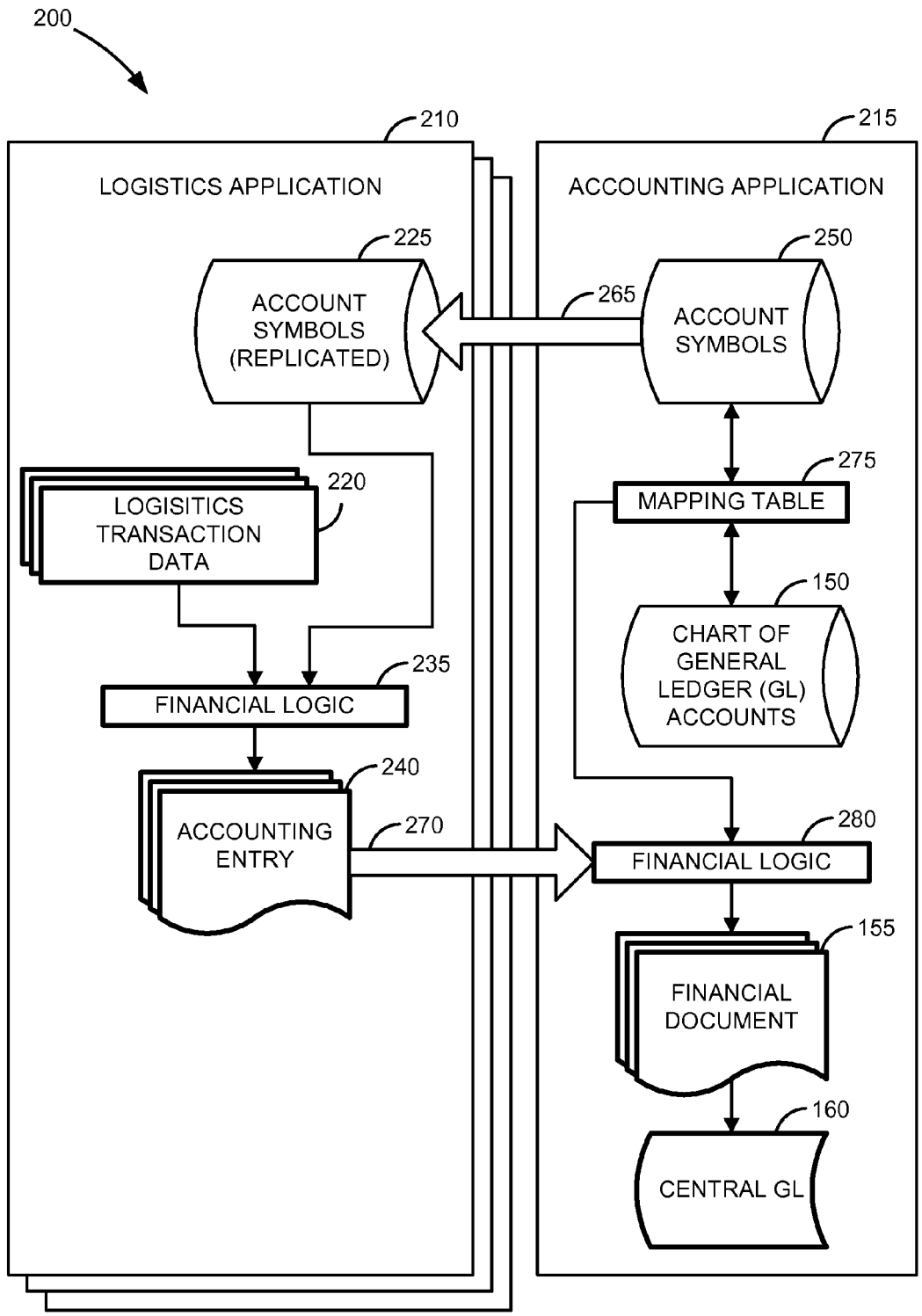
FIG. 2 is a block diagram of a computer system illustrating the elements for producing accounting records by a business application using account symbols corresponding to general ledger (GL) accounts, according to one embodiment of the invention.

FIG. 2 is a block diagram of a computer system 200 illustrating the basic elements for producing accounting records for the enterprise by a business application using account symbols corresponding to general ledger (GL) accounts, according to one embodiment of the invention Computer system 200 includes logistics application 210 and accounting application 215, similar to computer system 100 illustrated in FIG. 1. FIG. 2 uses logistics application 210 for illustration of an embodiment of the invention. It should be obvious to one of ordinary skill in the art that other types of business applications could be equally used for the same purpose instead of a logistics application. In another embodiment, computer system 200 could include a number of logistics applications 210, or a number of other types of business applications, or combinations of different types of business applications. The accounting mechanism implemented in logistics application 210 is simplified compared to the one implemented in logistics application 110 as shown in FIG. 1. Instead of chart of accounts and other finance configuration, logistics application 210 contains a list of account symbols 225. Each of the account symbols 225 is assigned to a general ledger account.

Logistics transaction data 220 stores information about the tasks or transactions performed in logistics application 210. The performed transactions correspond to actions or events of various business processes. For each such transaction, logistics application 210 generates accounting entry 240 according to implemented financial logic 235. Appropriate account symbols 225, based on the types of the transactions, are used in the generated accounting entries 240. Computer system 200 concentrates the main financial logic of accounting application 215 illustrated with block 280. Therefore, accounting entries 240 are not complete financial documents compared to financial documents 140 in FIG. 1. According to one embodiment of the invention, logistics application 210 does not create full featured financial documents, but only a kind of notification accounting entries. In these notifications account symbols are used to differentiate cost and revenue elements, e.g., stock accounts, etc., contained in the logistics transaction.

Accounting entries 240 are transferred to accounting application 215 using inbound interface 270, according to one embodiment of the invention. Interface 270 could be invoked by logistics application 210 directly. Alternatively, the functionality of inbound interface 270 could be triggered by receiving asynchronous messages at accounting application 215 containing accounting entries 240. Inbound interface 270 of accounting application 215 substitutes the account symbols with the corresponding GL accounts. Alternatively, account symbols in accounting entries 240 could be replaced with the corresponding GL account numbers by financial logic 280. Simplified accounting entries 240 are transformed by financial logic 280 to full featured financial documents 155 that are posted to enterprise central general ledger 160.

The correspondence between account symbols and GL account numbers is preserved in mapping table 275 that defines a relation between chart of GL accounts 150 and list of account symbols 250. According to one embodiment of the invention, the relation provided by mapping table 275 is one-to-one. Alternatively, one-to-many or many-to-many relations could be used instead. Different lists of account symbols 250 could be used by different business applications.

Account symbols 250 are distributed or replicated to logistics application 210 through interface 265. In different embodiments of the invention, interface 265 could be outbound interface of accounting application 215 or inbound interface of logistics application 210. When a change to chart of GL accounts 150 is required, the relevant updates are limited to accounting application 215 involving chart of GL accounts 150 and mapping table 275. Very rarely, changes to account symbols 250 are necessary. However, in order to have some potential for changing the assignments due to valuation or classification election changes, interface 265 could transfer not only account symbols 250, but also one or more major logistic classifications to logistics application 210. Respectively, interface 265 transfers basic configuration data for financial logic 235 in one embodiment of the invention.

Figure 3:
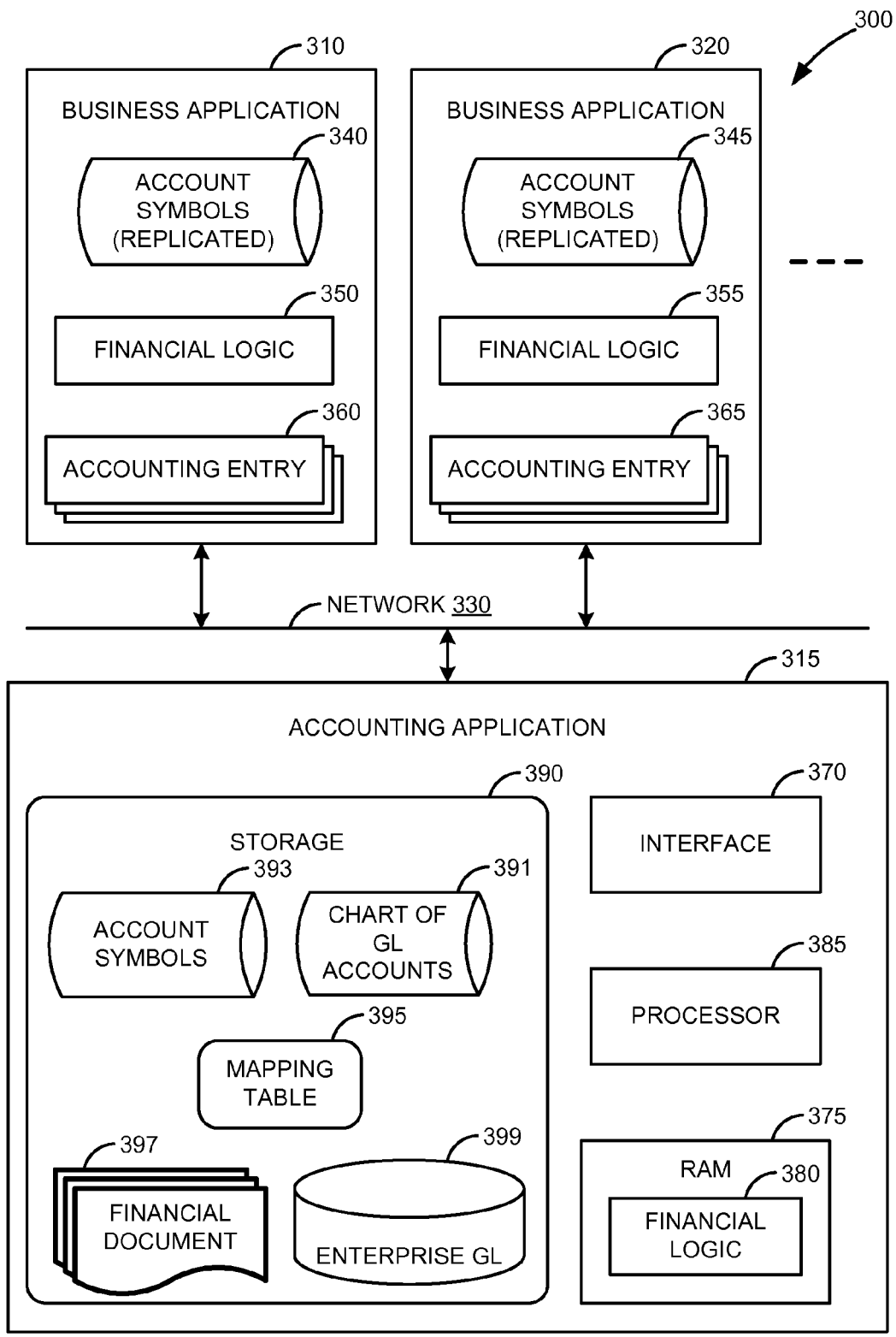
FIG. 3 is a block diagram of an enterprise computer system illustrating the elements for generating accounting records by a number of business applications using account symbols corresponding to general ledger (GL) accounts, according to one embodiment of the invention.

FIG. 3 is a block diagram of enterprise computer system 300 showing the basic elements for producing accounting records for the enterprise by a number of business applications using account symbols corresponding to GL accounts. Similar to computer system 200 illustrated in FIG. 2, computer system 300 includes accounting application 315 connected to business application 310 and business application 320 through network 330. Business applications 310 and 320 run in enterprise computer system 300 to automate various business processes. Alternatively, enterprise computer system 300 could include either one or more than one business applications.

According to one embodiment of the invention, business applications 310 and 320 could be of different types, e.g., automating different types of business processes, like for example, supply chain management application and logistics application. Business applications 310 and 320 could be developed by different vendors and integrated by a middleware layer or by utilizing standard interfaces (not illustrated). Further, business applications 310 and 320 could be developed by one and a same vendor, using similar interfaces. Furthermore, business applications 310 and 320 could be modules of a same enterprise resource planning application. Regardless of the concrete implementation, business applications 310 and 320 have similar modules and functionality for generating account records corresponding to the performed business transactions. Business applications 310 and 320 store lists of account symbols 340 and 345, respectively. Account symbols 340 and 345 are used by financial logic 350 and 355 to generate accounting entries 360 and 365 corresponding to the executed business transactions.

Business applications 310 and 320 communicate accounting entries 360 and 365, respectively, to accounting application 315 through network 330. Accounting application 315 provides interface 370 to receive accounting entries 360 and 365. According to one embodiment of the invention, financial logic 380 is stored as computer program instructions in random access memory (RAM) 375 for producing financial documents. Processor 385 executes instructions of interface 370 and financial logic 380 to receive accounting entries 360 and 365; to replace the account symbols 340 and 345 in accounting entries 360 and 365 with GL accounts according to mapping table 395; to generate full featured financial documents 397; and to post financial documents 397 to enterprise general ledger 399.

According to one embodiment of the invention, storage 390 provides means for storing any of the following: chart of GL accounts 391; list or lists of account symbols 393; mapping table 395 defining relation or correspondence between chart of GL accounts 391, and list or lists of account symbols 393; full featured financial documents 397; and enterprise general ledger 399. Storage 390 could be implemented as a relational database. In another embodiment of the invention, storage 390 could be an autonomous computer system outside accounting application 315 within enterprise computer system 300. In another embodiment of the invention, some of the enlisted elements could be persisted instead in a computer file system as one or more flat files, or files with various structure, e.g., extensible markup language (XML) files.

Figure 4:
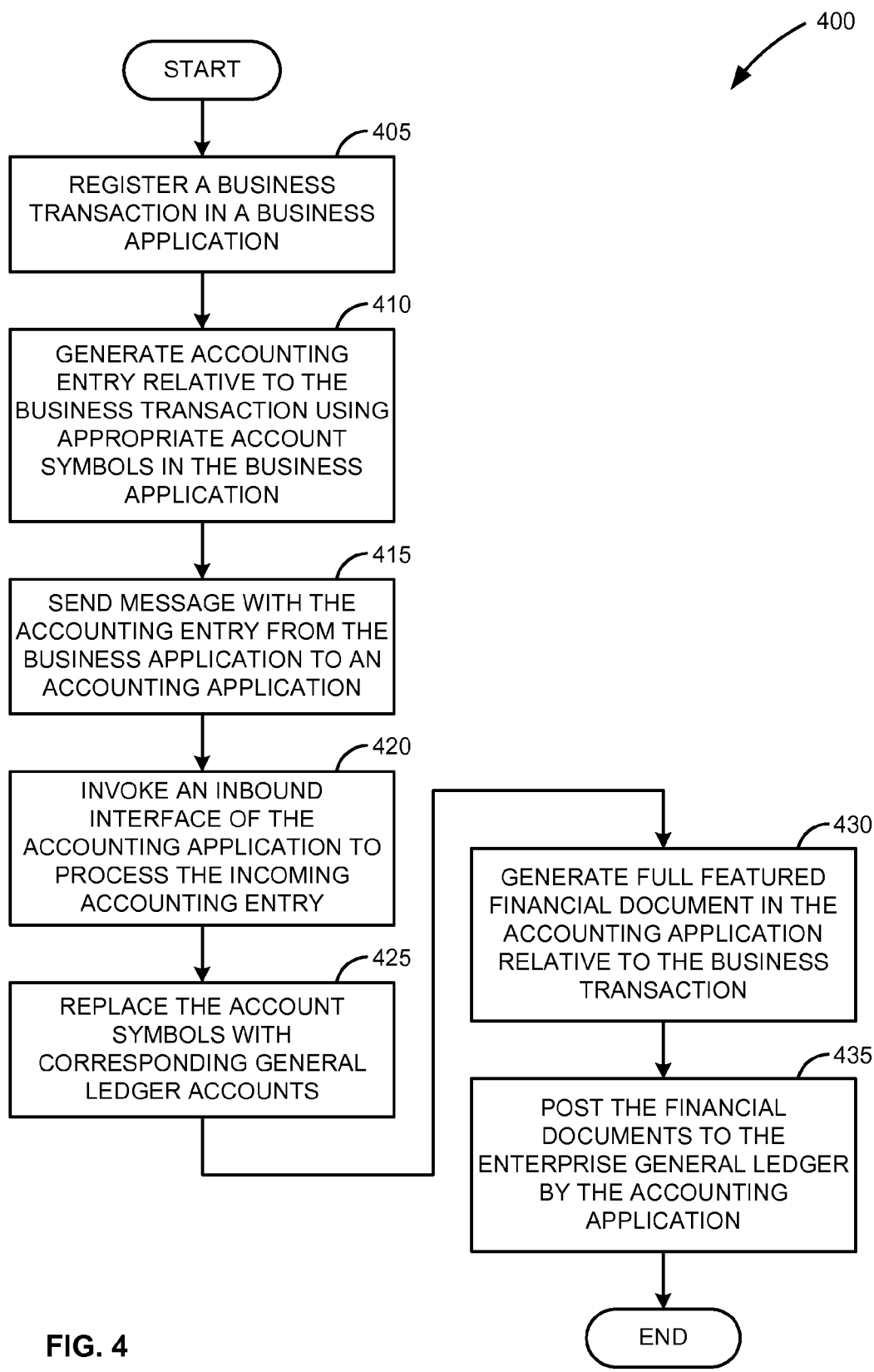
FIG. 4 illustrates a process for generating accounting records in an enterprise using account symbols corresponding to GL accounts by a business application, according to one embodiment of the invention.

FIG. 4 shows process 400 for generating accounting records in an enterprise using account symbols corresponding to GL accounts by a business application, according to one embodiment of the invention. At 405, a business transaction is performed or registered by one of the business applications running in the enterprise. Following the requirement for accounting recording, at 410, the business application generates an accounting entry corresponding to the registered business transaction. The accounting entry is generated based on the information for the business transaction, available in the business application, and includes appropriate account symbols for debits and credits.

Account symbols correspond to real account numbers, i.e., to general ledger accounts. The real account numbers may be defined within an enterprise based on internal principles, statutory requirements, etc.; or may be statutorily defined. An enterprise is obligated to generate and keep financial documents including detailed accounting records for every business transaction. The accounting records debit and credit different GL accounts. The various business applications of an enterprise execute business transactions and provide accounting data for generating the corresponding financial documents. In order to optimize the accounting recording, business applications produce simplified accounting entries corresponding to the business transaction that include account symbols instead of GL account numbers. For example, instead of keeping a full chart of GL accounts and spend resources to maintain a complex financial logic in a business application, a short list of account symbols applicable for the pertinent business could be used. The simplified accounting entries provide minimum information that is necessary to generate detailed financial document with real GL account numbers corresponding to the business transactions. The different business applications running in an enterprise may use different sets of account symbols.

Once generated, account entries are sent to an accounting application at 415. Business applications send messages or notifications containing the accounting entries corresponding to the performed business transactions or tasks. The accounting application provides complete accounting functionality to generate the detailed full featured financial documents for the general ledger of the enterprise. At 420, an inbound interface of the accounting application is invoked to handle the accounting entries received from the business applications. According to one embodiment of the invention, the interface is triggered within the accounting application by the incoming messages. Alternatively, call methods for the inbound interface could be provided directly to the business applications. Once invoked, inbound interface processes the received accounting entries.

At 425, the processing of the received accounting entries continues with replacing the account symbols with the relevant GL account numbers. The account symbols are substituted with account numbers based on a predefined correspondence. In one embodiment, the replacement could be based on defined correspondence, and on the type of the business transactions corresponding to the received accounting entries. The logic for the replacement of the account symbols with GL accounts could be integrated within the inbound interface. Alternatively, this functionality could be a part of the financial logic implemented in the accounting application.

After replacing the account symbols with GL account numbers, and based on the information in the received account entries, accounting application generates detailed financial documents for the business transactions at 430. The detailed financial documents contain all statutory features necessary to record the business transactions in the enterprise. At 435, the complete financial documents are posted to the enterprise general ledger by the accounting application.

Computer systems 200 and 300 as shown in FIG. 2 and FIG. 3, respectively, and process 400 as shown in FIG. 4 illustrate how the governance of the financial recording in an enterprise is improved by concentrating the financial logic in a single centralized accounting application or financial system. Thus, communication between business applications and the accounting application is simplified and easier to maintain. The frequent small statutory or organizational updates to the financial logic take place in the accounting application. Therefore, the support of the accounting functionality in the business applications is limited to few basic tasks. These tasks may include an initial setup of the accounting functionality, and occasional re-setup in case of larger updates of the financial logic, or the correspondence between account symbols and GL accounts. By following the described approach, the owners of the business applications and accounting application in the enterprise are more independent and autonomous.

Figure 5:
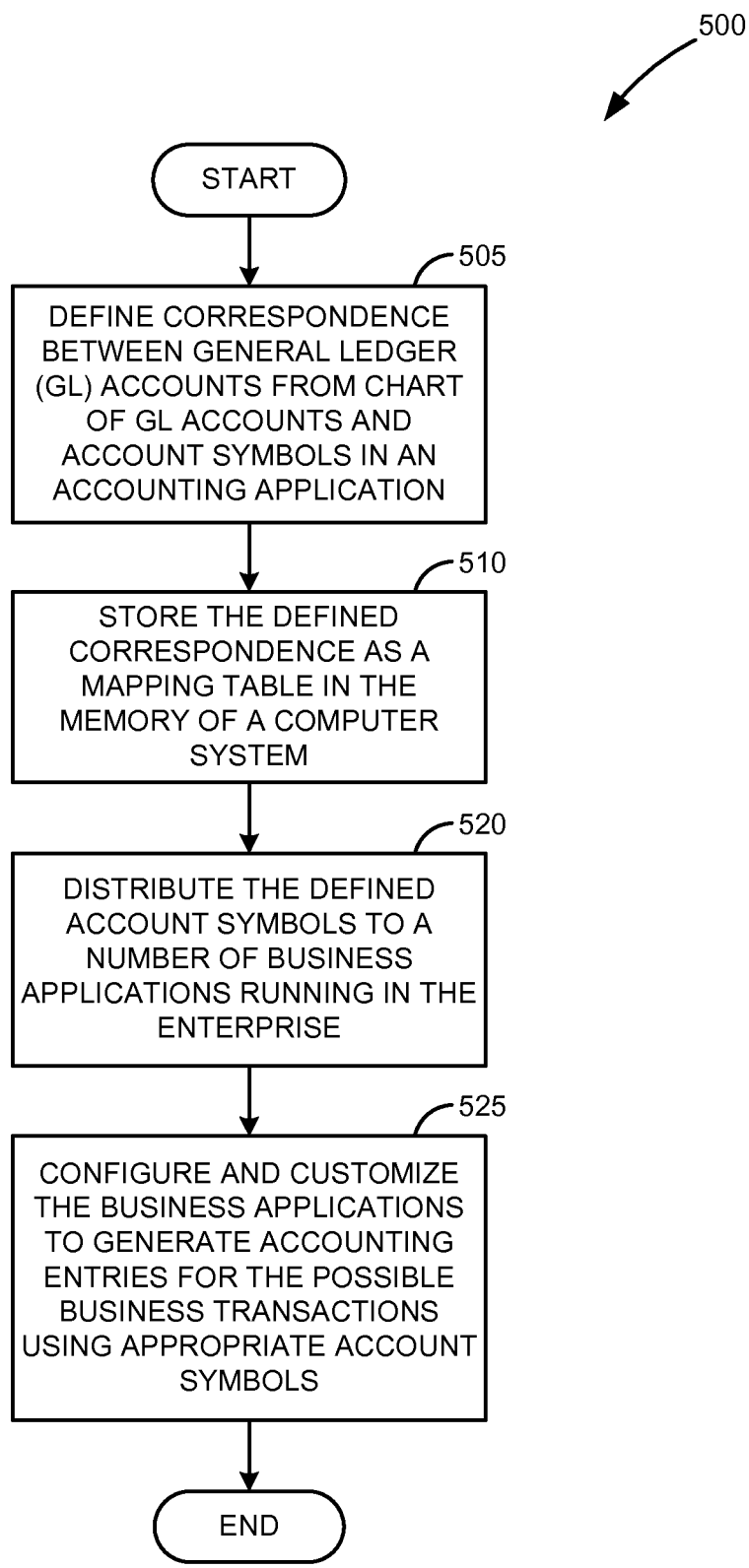
FIG. 5 illustrates a process for configuring a accounting application and a number of business applications in an enterprise, to generate accounting records using account symbols corresponding to GL accounts, according to one embodiment of the invention.

FIG. 5 shows process 500 for configuring a accounting application, and one or more business applications in an enterprise, to generate accounting records using account symbols corresponding to GL accounts. At 505, a correspondence between the GL accounts of the chart of GL accounts and a list of account symbols is defined in the accounting application. The correspondence relates the GL account numbers and the account symbols. A single GL account number is related to a single account symbol, according to one embodiment of the invention. In another embodiment, a single GL account number is related to more than one account symbols. Another possible combination of the relation between GL accounts and account symbols include more than one GL account numbers related to one account symbol, and more than one GL account numbers related to more than one account symbols. In one embodiment of the invention, the correspondence between the GL accounts and the account symbols may include a combination of different types of relationships.

At 510, the defined correspondence between the GL accounts and the account symbols is stored as a mapping table in the memory of a computer system accessed by the accounting application. The mapping table could be an electronic file with flat structure, or a file with a structure organized in a particular pattern, e.g., extensible markup language (XML) file. In one embodiment of the invention, the mapping table could be stored as a table, or combination of tables, in a database. Similar to the mapping table, the chart of GL accounts and the list of account symbols are also stored in the memory of a computer system.

At 520, the defined account symbols are distributed or replicated from the accounting application to one or more business applications executed in the enterprise. One and the same list of account symbols is distributed to the different business applications, according to one embodiment of the invention. Alternatively, different lists of account symbols are distributed to different business applications. Process 500 continues at 525 with initial configuration and customization of the financial logic implemented in each business application running in the enterprise. This initial setup allows business applications to generate accounting entries for the possible business transactions using the replicated account symbols.

Figure 6:
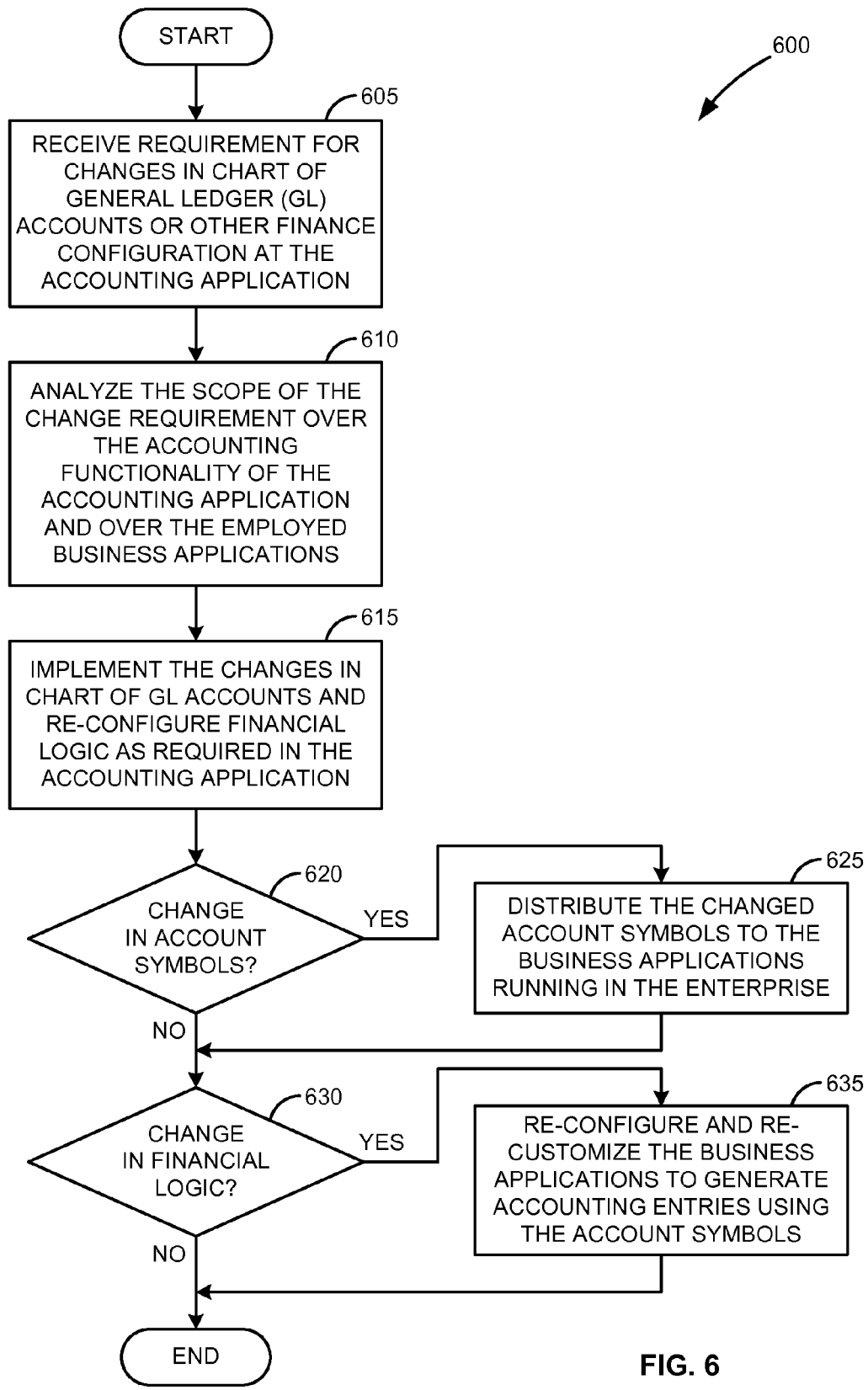
FIG. 6 illustrates a process for updating the financial configuration for generating accounting records using accounting symbols corresponding to GL accounts in an enterprise, according to one embodiment of the invention.

FIG. 6 shows process 600 for updating the financial configuration for generating accounting records using accounting symbols corresponding to GL accounts in an enterprise, according to one embodiment of the invention. Such updates, especially the update of the chart of GL ledger accounts, happen frequently due to various reasons. Statutory requirements regarding accounting records change from one financial period to another, e.g., from one fiscal year to the next. The internal reorganizations in an enterprise, e.g., changing the status of a legal entity, mergers and acquisitions, vertical or horizontal business integration, etc., may change the way of financial recording of the executed business transactions.

At 605, a requirement for change in the financial configuration of accounting application is received. The requirement for change may involve an update of the chart of GL accounts, an update of the financial configuration and customization of the financial logic, etc. The impact of the changes over the financial configuration of the enterprise is analyzed at 610. The analysis shows the scope of the change, the involved modules that implement the accounting functionality in the centralized accounting application and in the business applications employed in the enterprise. The required change could be limited to chart of accounts stored in the accounting application, or could involve reconfiguration of the entire accounting mechanism in the accounting applications and in the business applications.

At 615, the required changes or the accounting mechanisms are accomplished to the accounting application. The necessary updates to the chart of GL accounts are implemented, and the financial logic is re-configured, when necessary. At 620, the scope of the required change is checked to determine whether re-assignment of the account symbols to the GL accounts is involved. In other words, whether the correspondence between the GL account numbers and the account symbols is altered in such a way, that an update to the account symbols replicated to one or more of the employed business applications have been made. If there is a change in the account symbols assigned to GL accounts at the accounting application, the changed account symbols are distributed to the employed business applications at 625.

At 630, the scope of the required change is checked to determine whether re-configuration of the financial logic implemented in the employed business applications for generating accounting entries corresponding to the executed transactions is involved. In case such change is required, the financial logic or set up at the business applications is re-configured and re-customized accordingly at 635. Additionally, the financial logic in the business applications may require re-configuration or re-customization in order to use the appropriate account symbols that have been updated in response to the required changes.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
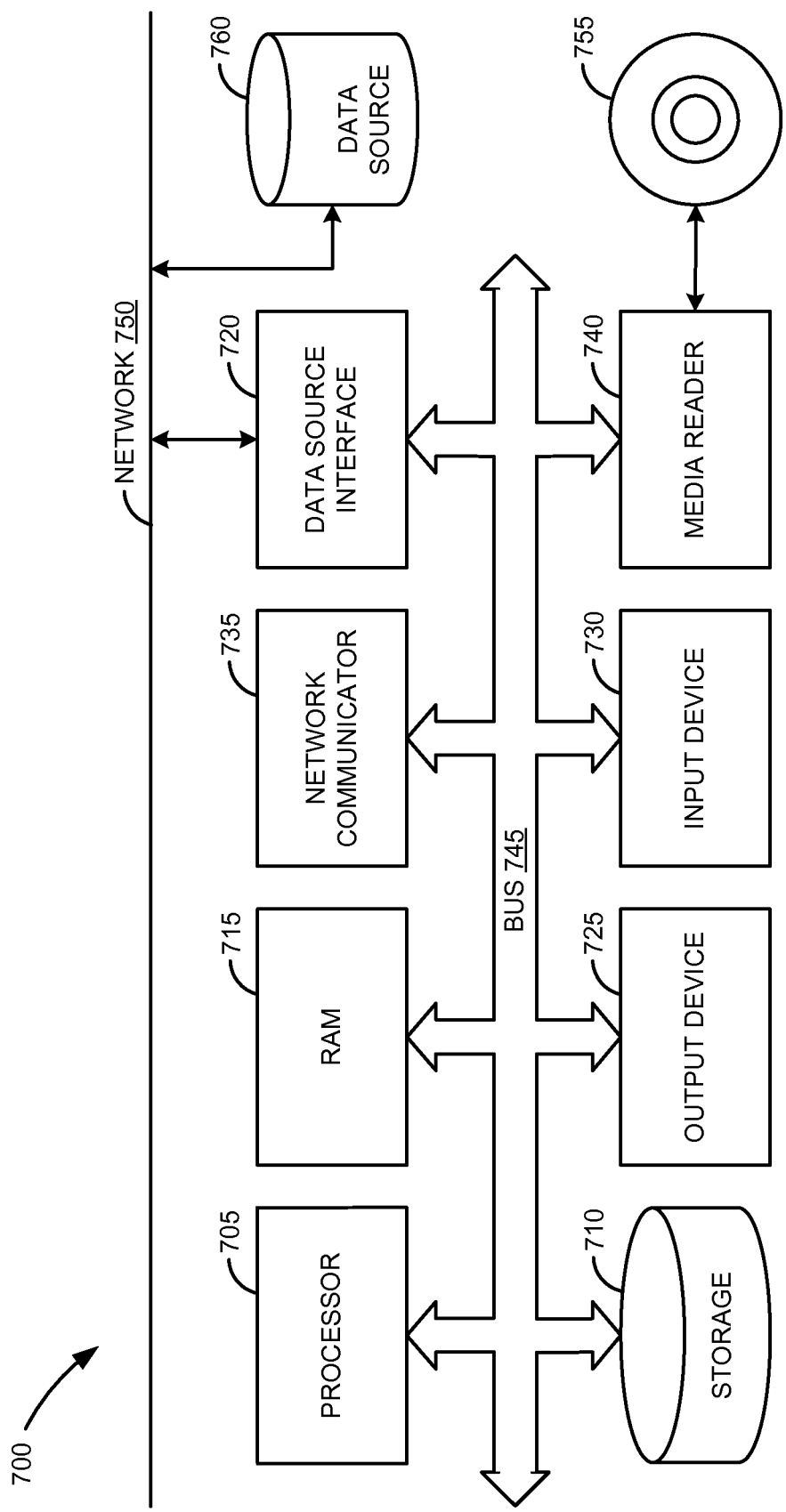
FIG. 7 is a block diagram of an exemplary computer system to execute computer readable instructions for generating accounting records in an enterprise by a business application using account symbols corresponding to GL accounts, according to one embodiment of the invention.

FIG. 7 is a block diagram of an exemplary computer system 700. The computer system 700 includes a processor 705 that executes software instructions or code stored on a computer readable medium 755 to perform the above-illustrated methods of the invention. The computer system 700 includes a media reader 740 to read the instructions from the computer readable medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be access via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture comprising a non-transitory computer-readable medium having computer readable instructions stored thereon for execution by a processor to:
   store in a memory of a computer system a correspondence between a plurality of account symbols and a plurality of statutory defined general ledger accounts;
   receive at a receiving computer application an accounting entry generated by a sending computer application, the accounting entry including an account symbol from the plurality of account symbols, wherein the accounting entry is generated based on a current configuration of a financial logic mechanism at the sending computer application;
   at the receiving computer application, replace the account symbol in the accounting entry with a general ledger account from the plurality of general ledger accounts based on the stored correspondence;
   update in the memory of the computer system one or more general ledger accounts of the plurality of general ledger accounts corresponding to the plurality of account symbols;
   receive at the receiving computer application a new accounting entry including the account symbol from the plurality of account symbols;
   at the receiving computer application, replace the account symbol in the new accounting entry with an updated general ledger account from the one or more updated general ledger accounts; and
   generate at least one electronic financial document at the receiving computer application based on the accounting entry and the new accounting entry, and further based on a current configuration of a financial logic mechanism at the receiving application.

2. The article of manufacture of claim 1, wherein storing the correspondence comprises:
   generating a mapping table to link one or more of the plurality of general ledger accounts with one or more corresponding account symbols from the plurality of account symbols; and
   persisting the mapping table in the memory of the computer system.

3. The article of manufacture of claim 2, wherein updating the one or more general ledger accounts of the plurality of general ledger accounts comprises:
   updating the mapping table in response to a change in a definition of the one or more general ledger accounts from the plurality of general ledger accounts.

4. The article of manufacture of claim 1 comprising a non-transitory computer-readable medium having computer readable instructions stored thereon for execution by a processor further to:
   distribute the plurality of account symbols to one or more computer applications within the enterprise environment.

5. The article of manufacture of claim 1, wherein receiving the accounting entry comprises:
   receiving an asynchronous electronic message comprising the accounting entry in a predefined electronic data format.

6. The article of manufacture of claim 1, wherein replacing the account symbol comprises:
   invoking an interface by the receiving application to identify the account symbol in the received accounting entry.

7. The article of manufacture of claim 1 comprising a non-transitory computer-readable medium having computer readable instructions stored thereon for execution by a processor further to:
   reconfigure the financial logic mechanism at the receiving computer application to generate electronic financial documents; and
   send a reconfiguration of the financial logic mechanism to the sending computer application based on the reconfiguration of the financial logic mechanism at the receiving computer application.

8. The article of manufacture of claim 1 comprising a non-transitory computer-readable medium having computer readable instructions stored thereon for execution by a processor further to:
   post the at least one financial document to an enterprise general ledger.

9. A computer system operable for optimizing accounting in a multi-system enterprise environment by using account symbols, the system comprising:
   a storage to store a correspondence between a plurality of account symbols and a plurality of statutory defined general ledger accounts;
   a processor; and
   a memory coupled to the processor storing instructions, which when executed from the memory, cause the processor to
   receive an accounting entry generated by a sending computer application, the accounting entry including an account symbol from the plurality of account symbols, replace the account symbol in the accounting entry with a general ledger account from the plurality of general ledger accounts based on the stored correspondence, update at the storage at least one general ledger account of the plurality of general ledger accounts corresponding to the plurality of account symbols, receive a new accounting entry including the account symbol from the plurality of account symbols, replace the account symbol in the new accounting entry with an updated general ledger account from the at least one updated general ledger accounts, and generate at least one electronic financial document based on the accounting entry and the new accounting entry, and further based on a current configuration of a financial logic mechanism.

10. The system of claim 9, wherein the storage further comprising:

a general ledger to include a plurality of electronic documents corresponding to a plurality of accounting entries.

11. The system of claim 9 further comprising:

an interface to receive an asynchronous message from the sending computer application, the message including the accounting entry in a predefined electronic data format; and an interface to distribute the plurality of account symbols to one or more computer applications within the enterprise environment.

12. The system of claim 9, wherein the memory comprises further instructions, which when executed from the memory, cause the processor to:

reconfigure the financial logic mechanism to process the incoming accounting entry, identify the account symbol and generate the at least one electronic financial document based on the correspondence between the account symbol and the general ledger account.

13. A computer implemented method to optimize accounting in an enterprise environment by using account symbols, the method comprising:

storing in a memory of a computer system a correspondence between a plurality of account symbols and a plurality of statutory defined general ledger accounts;

receiving at a receiving computer application an accounting entry generated by a sending computer application, the accounting entry including an account symbol from the plurality of account symbols, wherein the accounting entry is generated based on a current configuration of a financial logic mechanism at the sending computer application;

at the receiving computer application, replacing the account symbol in the accounting entry with a general ledger account from the plurality of general ledger accounts based on the stored correspondence;

updating in the memory of the computer system one or more general ledger accounts of the plurality of general ledger accounts corresponding to the plurality of account symbols;

receiving at the receiving computer application a new accounting entry including the account symbol from the plurality of account symbols;

at the receiving computer application, replacing the account symbol in the new accounting entry with an updated general ledger account from the one or more updated general ledger accounts; and generating at least one electronic financial document at the receiving computer application based on the accounting entry and the new accounting entry, and further based on a current configuration of a financial logic mechanism at the receiving application.

14. The method of claim 13, wherein storing the correspondence comprises:

generating a mapping table to link one or more of the plurality of general ledger accounts with one or more corresponding account symbols from the plurality of account symbols; and persisting the mapping table in the memory of the computer system.

15. The method of claim 14, wherein updating the one or more general ledger accounts of the plurality of general ledger accounts comprises:

updating the mapping table in response to a change in a definition of the one or more general ledger accounts from the plurality of general ledger accounts.

16. The method of claim 14 further comprising:

distributing the plurality of account symbols to one or more computer applications within the enterprise environment.

17. The method of claim 13, wherein receiving the accounting entry comprises:

receiving an asynchronous electronic message comprising the accounting entry in a predefined electronic data format.

18. The method of claim 13, wherein replacing the account symbol comprises:

invoking an interface by the receiving application to identify the account symbol in the received accounting entry.

19. The method of claim 13 further comprising:

reconfiguring the financial logic mechanism at the receiving computer application generate electronic financial documents; and sending a reconfiguration of the financial logic mechanism to the sending computer application based on the reconfiguration of the financial logic mechanism at the receiving computer application.

20. The method of claim 13 further comprising:

posting the financial document to an enterprise general ledger.

* * * * *